United States Patent
Lee et al.

(10) Patent No.: US 6,729,227 B2
(45) Date of Patent: May 4, 2004

(54) BREAD MAKER

(75) Inventors: Tae-Uk Lee, Suwon (KR); Han-Jun Sung, Suwon (KR); Jae-Ryong Park, Suwon (KR); Jang-Woo Lee, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/385,746

(22) Filed: Mar. 12, 2003

(65) Prior Publication Data

US 2004/0050257 A1 Mar. 18, 2004

(30) Foreign Application Priority Data

Sep. 14, 2002 (KR) .................................. 10-2002-55993

(51) Int. Cl.7 .............................. A23L 1/00; A47J 27/62; A47J 37/01; A21C 1/00
(52) U.S. Cl. .............................. 99/348; 99/353; 99/426
(58) Field of Search .......................... 99/325–331, 341, 99/342, 348, 343, 352–355, 426, 449; 366/69, 130, 143, 144–146, 149, 219, 240, 341, 349, 602; 222/94, 98, 100–102; 206/219, 221; 383/38; 426/128, 231, 232, 233, 392, 394, 87, 112, 113, 405, 120, 124, 512, 523

(56) References Cited

U.S. PATENT DOCUMENTS

| | | | |
|---|---|---|---|
| 4,550,653 A | * | 11/1985 | Hedenberg ................... 99/348 |
| 4,550,654 A | * | 11/1985 | Hedenberg ................... 99/348 |
| 4,590,850 A | * | 5/1986 | Hedenberg ................... 99/348 |
| 4,803,086 A | * | 2/1989 | Hedenberg ................... 426/87 |
| 5,146,840 A | | 9/1992 | Hedenberg |
| 5,947,009 A | | 9/1999 | Hedenberg |
| 6,029,563 A | | 2/2000 | Nakagawa et al. |
| 6,053,096 A | | 4/2000 | Kakimoto et al. |
| 6,321,641 B1 | * | 11/2001 | Wang ........................... 99/348 |

FOREIGN PATENT DOCUMENTS

| | | |
|---|---|---|
| GB | 2213698 | 8/1989 |
| WO | 99/25467 | 5/1999 |

OTHER PUBLICATIONS

English language Abstract of JP 02 126026, undated.

International Search Report and Annex, undated.

* cited by examiner

Primary Examiner—Timothy F. Simone
(74) Attorney, Agent, or Firm—Staas & Halsey LLP

(57) ABSTRACT

A bread maker having upper and lower rollers, a baking tray, a housing forming an oven chamber, a door attached to the front of the housing, a baking tray detachably mounted in the oven chamber, and a sensor. The sensor senses whether the baking tray is mounted in the oven chamber. The sensor is mounted in at least one of the housing and the door and moves back and forth a predetermined distance depending on contact with the baking tray. A sensing switch which senses the movement of the sensor.

15 Claims, 5 Drawing Sheets

BREAD MAKER

CROSS-REFERENCE TO RELATED APPLICATION

This application claims the benefit of Korean Patent Application No. 2002-55993 filed on Sep. 14, 2002 in the Korean Intellectual Property Office, the disclosure of which is incorporated herein by reference.

BACKGROUND OF THE INVENTION

1. Field of the Invention

The present invention relates generally to a bread maker and, more particularly, to a bread maker with a sensor that senses whether the baking tray is mounted.

2. Description of the Related Art

A bread maker is an apparatus that makes bread using, for example, a mixing bag containing bread ingredients. The bread maker can automatically make a variety of breads depending on the types of the bread ingredients. FIG. 1 is a sectional view showing the structure of a conventional bread maker. As shown in FIG. 1, the conventional bread maker includes a housing 1 defining the outer structure of the bread maker. The housing 1 contains an oven chamber 2, and a door 3 is mounted on the front of the housing 1 that is selectively opened and closed. Other parts used to make bread are mounted inside the housing 1.

Upper and lower rollers 5 and 6 hold the upper and lower ends of a mixing bag 4 and raise and lower the mixing bag 4 to mix the bread ingredients and form a dough. The upper and lower rollers 5 and 6 can be rotated in both forward and reverse directions. A baking tray 7 forms a bread making space to accommodate the mixing bag 4 and fits in the lower part of the oven chamber 2. The baking tray 7 has a front half 7a and a rear half 7b that can separate from each other.

A slit 9 is formed in the center of a scraper 10 to allow the upper portion of the mixing bag 4 to pass therethrough. Accordingly, when the mixing bag 4 is moved upwardly by the rotation of the upper and lower rollers 5 and 6, the mixing bag 4 passes through the slit 9, but the bread ingredients are scraped downward and do not move upward through the slit 9. Another slit 11, which has the same function as that of the slit 9, is formed in the center of the baking tray 7.

Accordingly, when the mixing bag 4 moves downwardly by the rotation of the upper and lower rollers 5 and 6, the mixing bag 4 passes through the slit 11, but the bread ingredients remain in the baking tray 7 to form the dough. After forming the dough, the mixing bag 4 moves in the direction of the lower roller 6 and tears, leaving the dough in the baking tray 7 as the mixing bag leaves the baking tray 7 through the slit 11.

A plurality of heaters 12a, 12b, 12c are mounted on the inner surface of the oven chamber 2, which is inside the housing 1, and the inner surface of the door 3 to bake the dough with appropriately supplied heat.

When making bread using the conventional bread maker of FIG. 1, the rear half 7b of the baking tray 7 is placed in the oven chamber 2. The mixing bag 4, which contains the dry bread ingredients 110, is positioned by placing upper and the lower portions of the mixing bag 4 through the slit 9 of the scraper 10 and the slit 11 of the baking tray 7. The upper and lower rollers 5 and 6 hold the upper and lower ends of the mixing bag 4. After mounting the front half 7a of the baking tray 7 in the oven chamber 2 and closing the door 3, the bread maker is ready to be operated.

However, with the conventional bread maker, users mistakenly tend to turn on the bread maker without mounting the front half 7a of the baking tray 7 when installing the mixing bag 4. In this case, the conventional bread maker operates as usual, causing the mixing bag 4 to explode. Thus, the ingredients of the mixing bag 4 are spread all over the oven chamber 2, resulting in the oven chamber 2 needing to be cleaned.

SUMMARY OF THE INVENTION

It is an aspect of the present invention to provide a bread maker with a sensor that senses whether the baking tray is correctly mounted and prevent operation of the bread maker when the baking tray is incorrectly mounted.

Additional aspects and advantages of the invention will be set forth in part in the description that follows, and, in part, will be obvious from the description, or may be learned by practice of the invention.

To achieve the above and/or other aspects according to the present invention, there is provided a bread maker including a housing forming an oven chamber; a door mounted to a front of the housing that is selectively opened and closed; a baking tray detachably mounted in the oven chamber; and a sensor sensing whether the baking tray is mounted.

The sensor includes a sensing member attached to at least one of the housing and the door and moving back and forth a predetermined distance depending upon contact with the baking tray, and a sensing switch sensing movement of the sensing member.

The door comprises an inner panel and an outer panel spaced apart from the inner panel a predetermined distance.

The sensor further comprises an operating lever made of an elastic material that makes a seesaw movement in a space between the inner panel and the outer panel.

One end of the sensing member contacts one end of the operating lever, and the other end of the sensing member penetrates the inner panel and extends into the oven chamber toward the baking tray.

The sensing switch is mounted in a space between the inner panel and the outer panel of the door and is contacted by another end of the operating lever.

To achieve the above and/or other aspects according to the present invention, there is provided a sensor for a bread maker having a housing forming an oven chamber, a door attached to the housing with an inner panel and an outer panel, and a baking tray detachably mounted within the oven chamber, the sensor including a sensing member extending from between the outer panel and the inner panel, through the inner panel, to the oven chamber, and having a first end between the outer panel and the inner panel and a second end within the oven chamber; a sensing switch attached to the inner panel; and an operating lever between the inner panel and the outer panel and having a top end and a bottom end connected to the first end of the sensing member, wherein when the baking tray is mounted in the oven chamber and the door is closed, the second end of the sensing member contacts the baking tray and is pushed back in the direction of the door, the first end pushing back the operating lever to cause the top end of the operating lever to tilt toward and contact the sensing switch to sense whether the baking try is mounted in the oven chamber.

These, together with other aspects and advantages that will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

The above and other aspects and advantages of the present invention will from the following detailed description, taken in conjunction with the accompanying drawings, of which.

DETAILED DESCRIPTION OF THE PREFERRED EMBODIMENT

Figure 1:
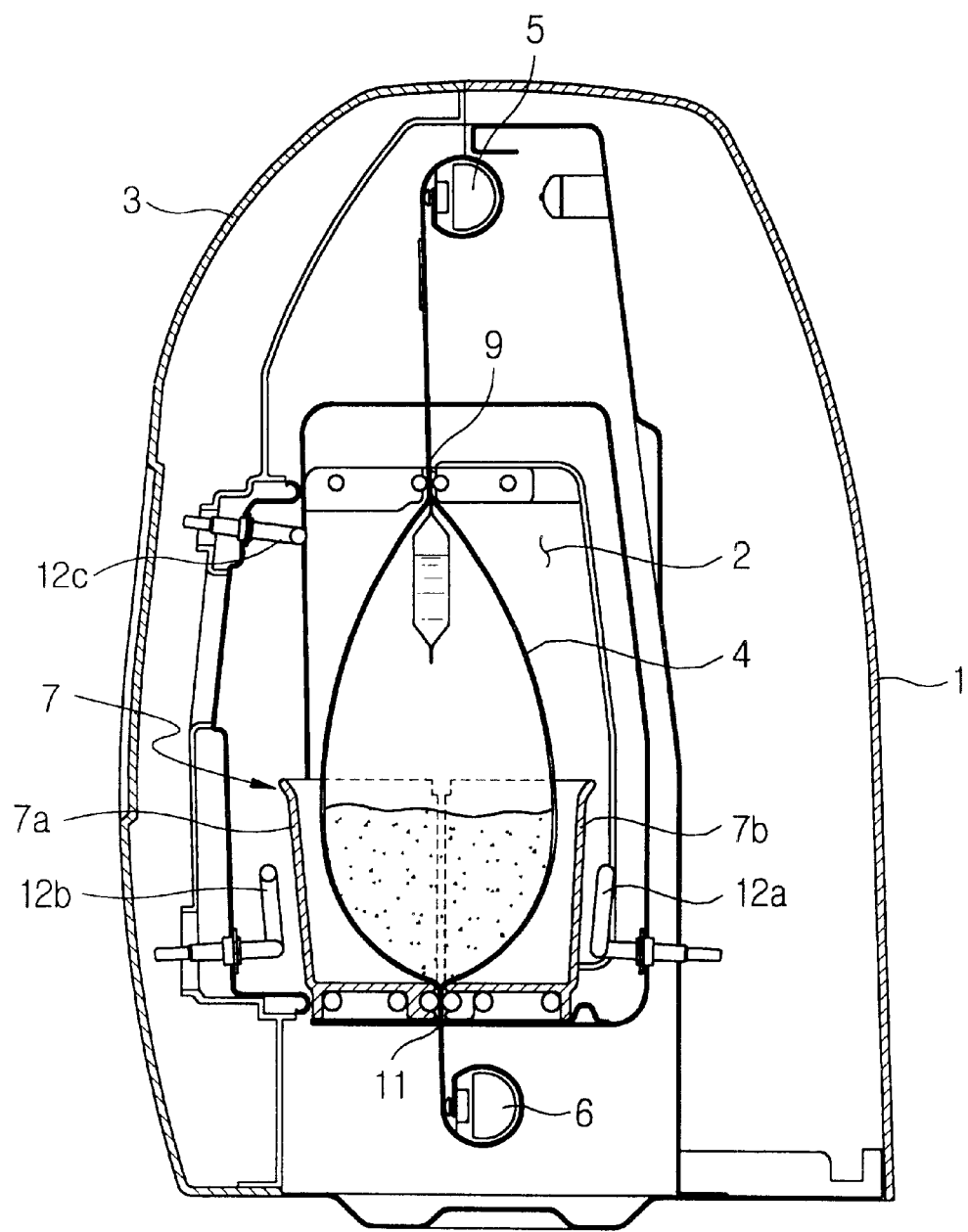
FIG. 1 is a sectional view schematically showing the structure of a conventional bread maker.

Hereinafter, an embodiment of the present invention will be described in detail with reference to the attached drawings, wherein the like reference numerals refer to the like elements throughout. The present invention may, however, be embodied in many different forms and should not be construed as being limited to the embodiment set forth herein; rather, this embodiment is provided so that the present disclosure will be thorough and complete, and will fully convey the concept of the invention to those skilled in the art.

Figure 2:
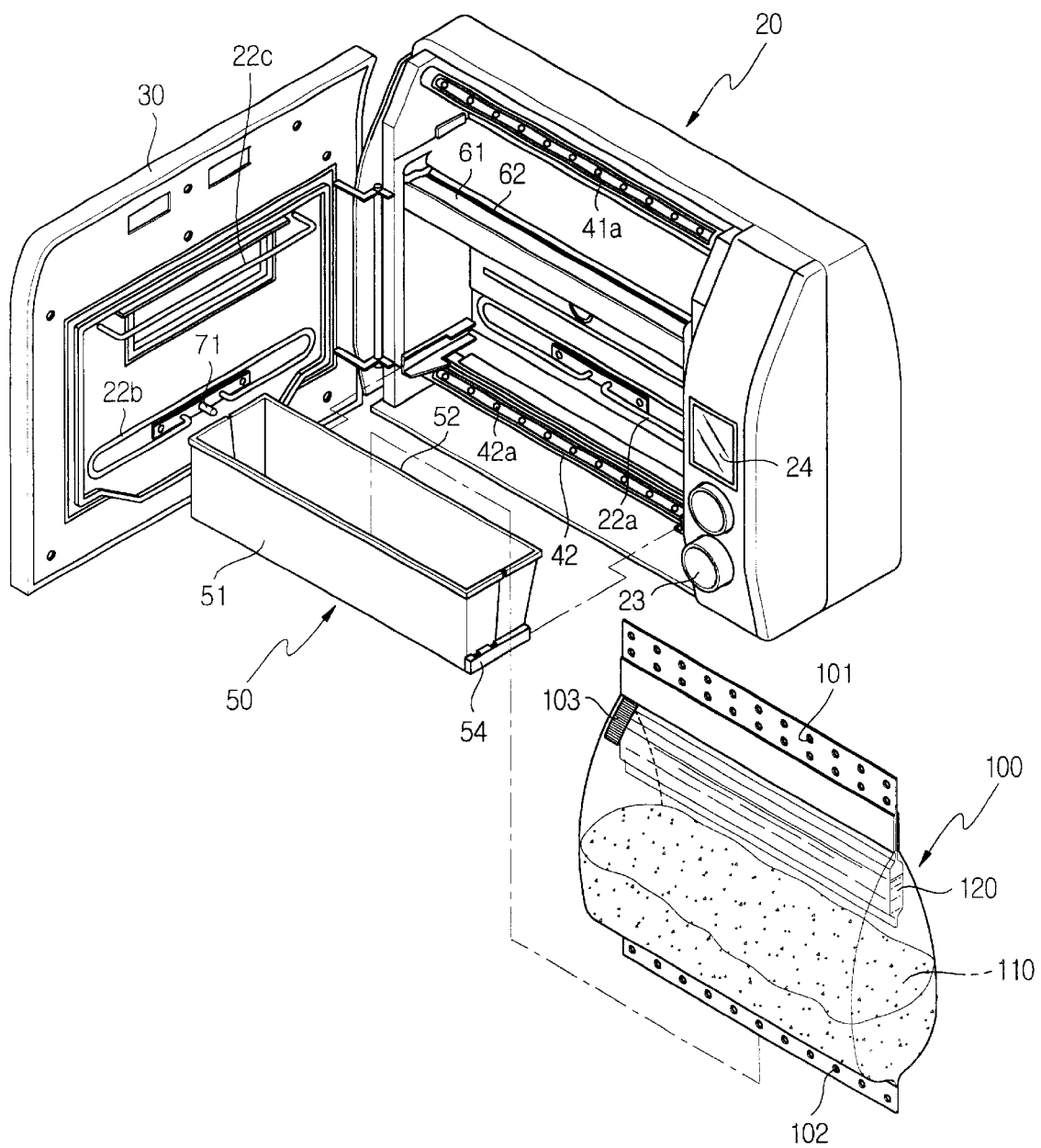
FIG. 2 is a perspective view showing the construction of the bread maker and the mixing bag according to an embodiment of the present invention.
Figure 3:
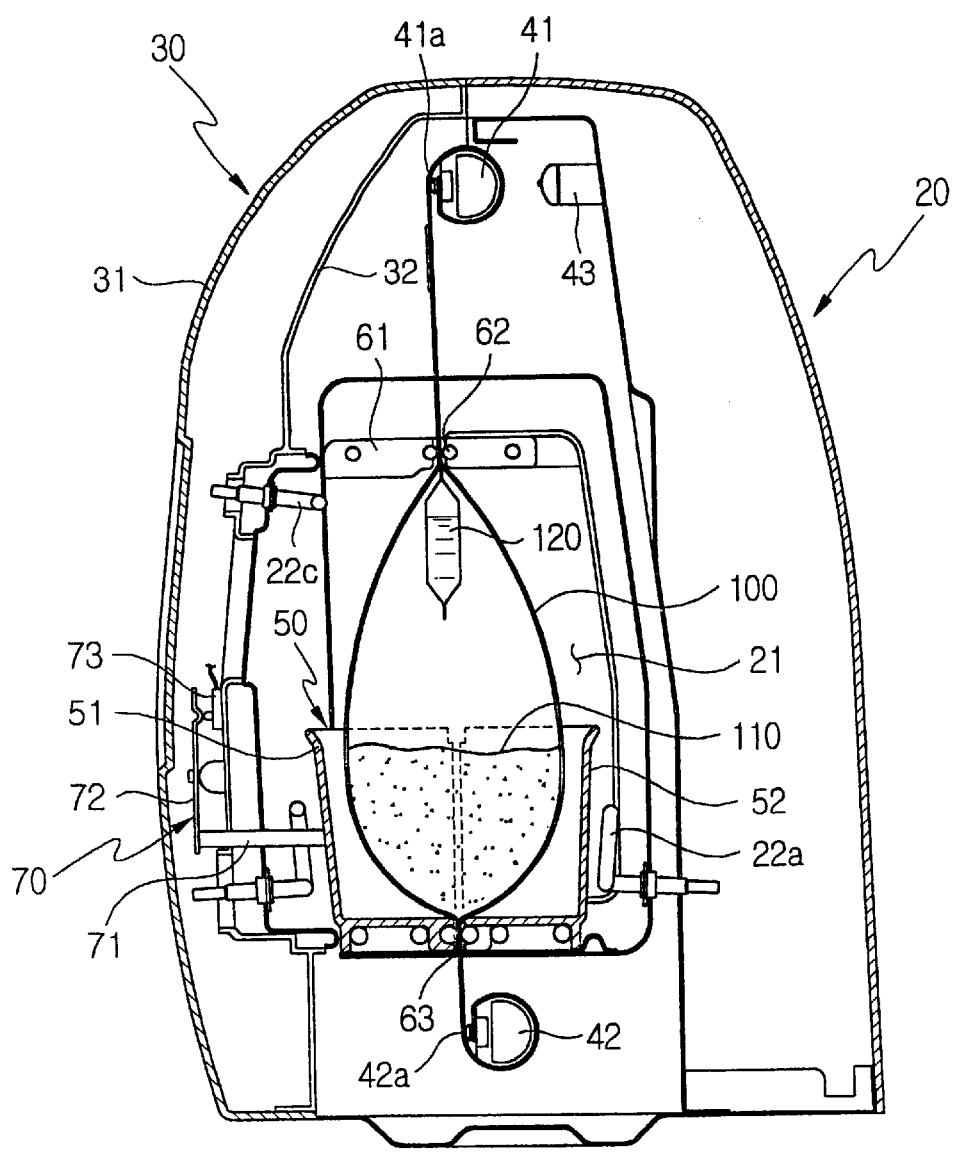
FIG. 3 is a sectional view showing the structure of the bread maker of FIG. 2.

FIG. 2 is a perspective view showing the construction of a bread maker and a mixing bag according to an embodiment of the present invention. FIG. 3 is a sectional view showing the structure of the bread maker of FIG. 2. Referring to FIGS. 2 and 3, the bread maker includes a housing 20 and a door 30. An oven chamber 21 within the housing 20 is used for containing and baking bread. The door 30 selectively opens and closes the front of the housing 20.

The inside surface of the door 30 and the inside surface of the oven chamber 21 have a plurality of heaters 22a, 22b, 22c to heat the inner part of the oven chamber 21 to bake bread with appropriately supplied heat. A control knob 23 is formed on the front of the housing 20 to control the operations of the bread maker. A display 24 is also formed on the front of the housing 20 to visually provide information to a user.

An upper roller 41 and a lower roller 42 are mounted on an upper and a lower portion of the oven chamber 21 inside the housing 20. The upper and lower ends of a mixing bag 100 are inserted into and held by the upper and lower rollers 41 and 42, respectively. The upper roller 41 and the lower roller 42 are extended horizontally and parallel to each other. The upper roller 41 and the lower roller 42 can be rotated in both forward and reverse directions by the action of a belt (not shown) that is rotated by a motor (not shown).

A plurality of fixing projections 41a, 42a are formed on the upper roller 41 and the lower roller 42 and inserted into fixing holes 101, 102 formed in the upper and lower parts of the mixing bag 100, respectively. A bar code scanner 43 reads a bar code 103 attached to the mixing bag 100, and is positioned in the upper portion of the interior of the housing 20 close to the upper roller 41 to provide ingredients and cooking information.

The mixing bag 100 is made of an elastic material, such as vinyl. Dry bread ingredients 110 are contained in the mixing bag 100. The dry bread ingredients 110 include grain powder, such as wheat flour, that is the principal ingredient of bread. An inner bag 120 containing baking liquid ruptures in the mixing bag 100 so that the baking liquid can be mixed with the dry bread ingredients 110 to form a dough.

A baking tray 50 forms a bread making space to accommodate the mixing bag 100 in the lower portion of the oven chamber 21 within the housing 20, and detachably mounts to the oven chamber 21. The baking tray 50 is, for example, a rectangularly shaped container with a horizontal length and open top. A projected fitting part 54 is formed on each lower end of the baking tray 50 and fits within a guiding rail 53 formed on each lower inner surface of the oven chamber 21. The baking tray 50 has a detachable front half 51 and a rear half 52.

A scraper 61 in which a slit 62 is formed to allow the mixing bag 100 to pass therethrough is formed on an upper part of the oven chamber 21. When the mixing bag 100 is upwardly moved by the rotation of the upper and lower rollers 41 and 42, the mixing bag 100 passes through the slit 62, but the bread ingredients are scraped downward. A slit 63 having the same function as that of the slit 62 is formed in the lower part of the baking tray 50. The slit 63 of the baking tray 50 through which the mixing bag 100 passes is formed as a gap between the lower surface of the front half 51 and the rear half 52 of the baking tray 50.

Thus, the mixing bag 100 is raised and lowered by the rotation of the upper roller 41 and lower roller 42, but the bread ingredients stay in the baking tray 50 and are mixed to form the dough.

According to the embodiment of the present invention, a sensor 70 senses whether the user has correctly set a front half 51 of the baking tray 50 in the oven chamber 21 after mounting the mixing bag 100.

Figure 4:
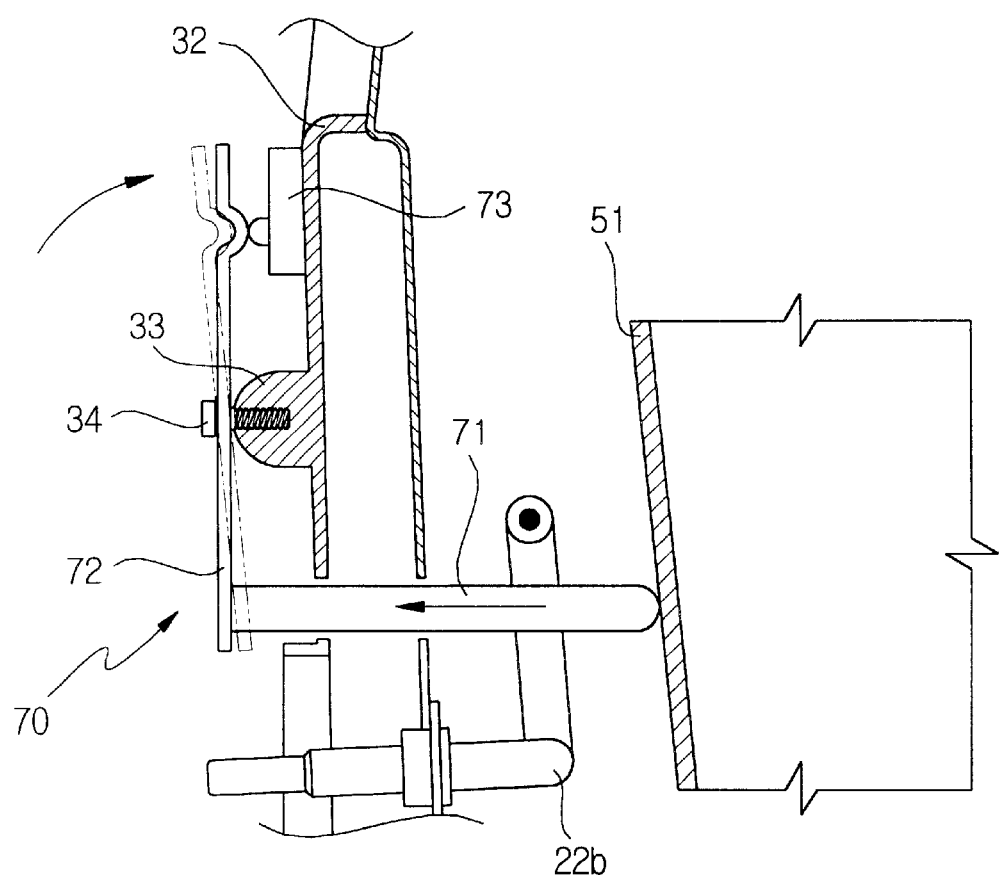
FIG. 4 is a sectional view schematically showing the construction of a baking tray sensor of the bread maker of FIG. 3.
Figure 5:
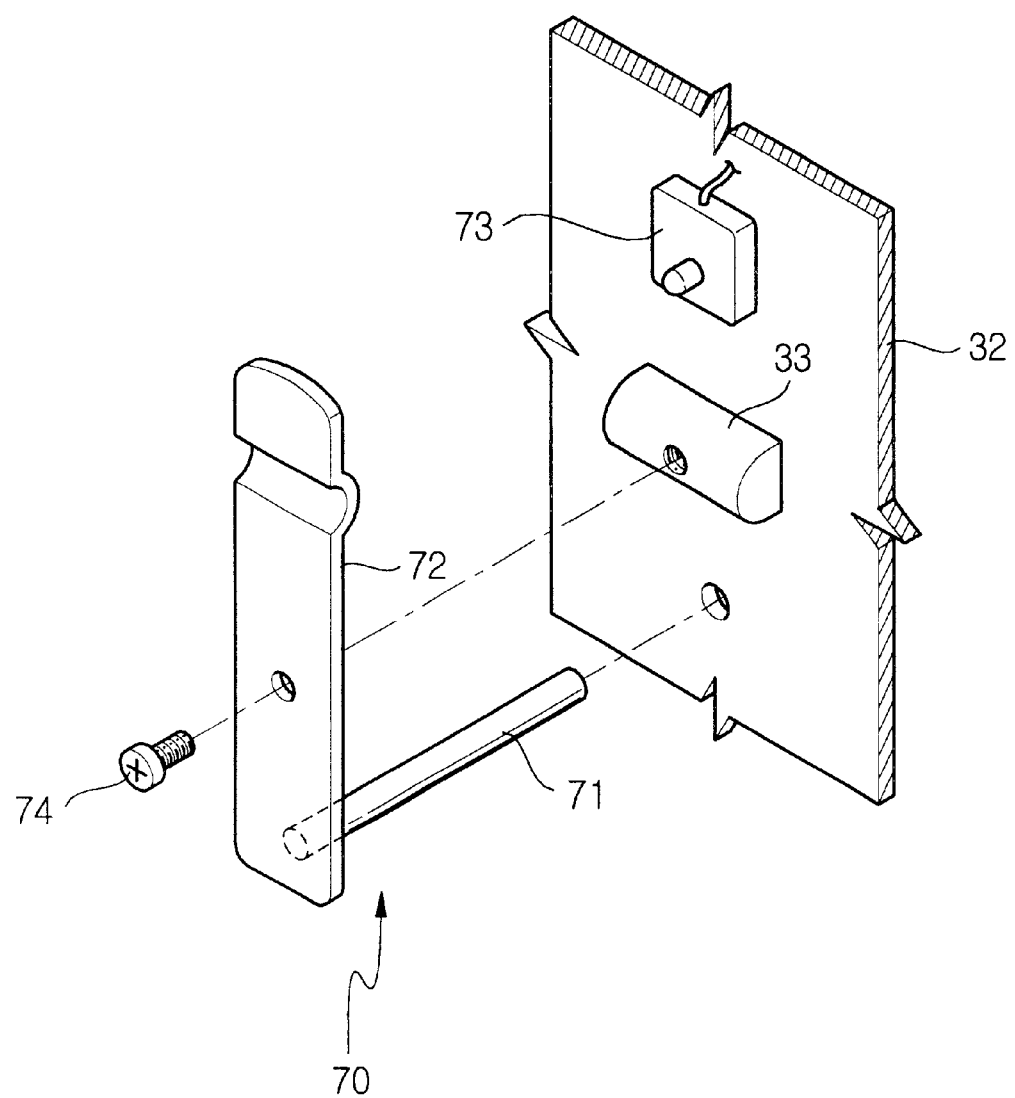
FIG. 5 is a perspective view showing the construction of the baking tray sensor of FIG. 4 according to the embodiment of the present invention.

FIG. 4 is a sectional view schematically showing the construction of the baking tray sensor 70 of the bread maker. FIG. 5 is a perspective view showing the construction of the baking tray sensor 70 shown in FIG. 4.

As shown in FIG. 3 through FIG. 5, the sensor 70 has a sensing member 71 that extends through an inner panel 32 of the door 30 and moves back and forth depending on whether the front half 51 of the baking tray 50 is mounted. An operating lever 72 makes a seesaw movement depending on the back and forth movement of the sensing member 71, and is set in the space between an outer panel 31 and the inner panel 32 of the door 30. A sensing switch 73 is pressed or released according to the movement of the operating lever 72.

The sensing member 71 is a bar-shaped device, for example, with a predetermined length, and extends from the space between the outer panel 31 and the inner panel 32 of the door 30, through the inner panel 32, to the inner part of the oven chamber 21. The sensing member 71 is fixed to one end of the operating lever 72, which is mounted in the space between the outer panel 31 and inner panel 32 of the door 30, and the other end contacts the front half 51 of the baking tray 50 when mounted in the oven chamber 21. The sensing member 71 moves back and forth a predetermined distance depending on whether the front half 51 of the baking tray 50 is mounted.

The operating lever 72 is a flat plate, for example, made of an elastic material with a predetermined length. The center of the operating lever 72 is jointed to a projected supporting part 33 from the inner panel 32 of the door 30 by a fixing screw 34. The fixing screw 34 is jointed loosely to the operating lever 72 and the supporting part 33 so that the operating lever 72 can make a seesaw movement toward the sensing switch 73 as the sensing member 71 contacts the front half 51 of the baking tray 50 when the front half 51 is mounted and the door 30 is closed. The sensing switch 73 is fixed to the inner panel 32 of the door 30 and is pressed by the end of the operating lever 72 that is opposite the sensing member 71 as the operating lever 72 makes seesaw movements.

In the embodiment of the present invention shown in FIG. 3, the sensor 70 is mounted on the door 30, but the sensor 70 may be attached to the bread maker in other ways, such as by mounting the sensing member 71 on a side surface of the oven chamber 21 of the housing 20 such that the sensing member 71 contacts the side surface of the front half 51 of the baking tray 50, with the operating lever 72 and the sensing switch 73 placed in the side part of the housing 20.

The application and operation of the bread maker according to an embodiment of the present invention is described below with reference to FIGS. 3 through 5.

To make bread, the mixing bag 100, which contains the dry bread ingredients 110, is placed in the housing 20 and a rear half 52 of the baking tray 50 is mounted in the oven chamber 21 before operation of the bread maker. The upper and lower ends of the mixing bag 100 are inserted onto and held by the fixing projections 41a and 42a of the upper roller 41 and the lower roller 42, respectively. Then, after mounting the front half 51 of the baking tray 50 in the oven chamber 21, the door 30 is closed.

When the front half 51 of the baking tray 50 has been mounted in the oven chamber 21, the sensing member 71 mounted in the door 30 contacts the front half 51 of the baking tray 50 and moves back toward the door 30 a predetermined distance as the door 30 is closed. The sensing member 71 pushes back the bottom part of the operating lever 72, which causes the upper part of the operating lever 72 to press the sensing switch 73. Thus, the bread maker is able to determine whether the front half 51 of the baking tray 50 has been placed in the oven chamber 21 and mounted correctly.

The upper roller 41 and the lower roller 42 rotate in both forward and reverse directions to move the mixing bag 100 up and down repeatedly for a predetermined time. When the mixing bag 100 moves in an upward direction, the mixing bag 100 passes through the slit 62, but the bread ingredients are scraped downward and do not move toward the upper roller 41. When the mixing bag 100 moves in a downward direction, the mixing bag 100 passes through the slit 63, but the bread ingredients remain in the baking tray 50 to form the dough. The inner bag 120 containing the baking liquid ruptures in the mixing bag 100 so that the baking liquid can be mixed with the dry bread ingredients 110 to form the dough.

After the dough has been formed, the mixing bag 100 moves downward and ruptures. The dough remains in the baking tray 50 while the mixing bag 100 rolls onto the lower roller 42 for disposal.

When mixing is completed, the heaters 22a, 22b, 22c, which are mounted on the inner surface of the door 30 and the inner part of the oven chamber 21, turn on and heat the inner part of the oven chamber 21 to bake the dough. After baking the bread, the user can open the door 30 and remove the baking tray 50 that holds the baked bread.

However, the user may mistakenly not mount the front half 51 of the baking tray 50 and close the door 30 after mounting the mixing bag 100 in the oven chamber 21. In this case, when the door 30 is closed, the sensing member 71 and the operating lever 72, which are mounted in the door 30, do not move. Consequently, the sensing switch 73 is not pressed. A control part of the bread maker (not shown) detects that the baking tray 50 is not mounted correctly using the output of the sensing switch 73, and prevents the bread maker from operating.

As described above, the present invention provides a bread maker with a sensor that senses whether a baking tray has been mounted. If the baking tray has not been mounted, the bread maker will not operate. Thus, the mixing bag will not rupture when the baking tray has not been installed correctly, avoiding the need to clean the ingredients from the oven chamber 21.

Although an embodiment of the present invention has been shown and described, it will be appreciated by those skilled at various modifications, additions, and substitutions are possible, without departing from the principles and spirit of the invention, the scope of which is defined in the accompanying claims and their equivalents.

What is claimed is:

1. A bread maker, comprising:
    a housing forming an oven chamber;
    a door mounted to a front of the housing that is selectively opened and closed;
    a baking tray detachably mounted in the oven chamber; and
    a sensor sensing whether the baking tray is mounted.

2. The bread maker according to claim 1, wherein the sensor comprises:
    a sensing member attached to at least one of the housing and the door and moving back and forth a predetermined distance depending upon contact with the baking tray; and
    a sensing switch sensing movement of the sensing member.

3. The bread maker according to claim 2, wherein the door comprises an inner panel and an outer panel spaced apart from the inner panel.

4. The bread maker according to claim 3, wherein the sensor further comprises an operating lever made of an elastic material that makes a seesaw movement in a space between the inner panel and the outer panel, wherein
    one end of the sensing member contacts one end of the operating lever, and the other end of the sensing member penetrates the inner panel and extends into the oven chamber toward the baking tray, and
    the sensing switch is mounted in a space between the inner panel and the outer panel of the door and is contacted by another end of the operating lever.

5. The bread maker according to claim 1, further comprising:
    an upper roller and a lower roller mounted on an upper and a lower portion of the oven chamber, the upper roller and the lower roller having a plurality of projections; and
    a mixing bag having a plurality of holes on an upper end and a lower end thereof to receive the projections of the upper roller and the lower roller, respectively.

6. The bread maker according to claim 5, further comprising a bar code scanner positioned in an upper portion of the housing close to the upper roller, the bar code scanner reading a bar code attached to the mixing bag to provide ingredients and cooking information.

7. The bread maker according to claim 5, wherein the mixing bag contains dry bread ingredients and an inner bag with a baking liquid, the upper roller and the lower roller rotating to move the mixing bag up and down, and the inner bag being tom as the mixing bag moves up and down to mix the baking liquid with the dry bread ingredients and form a dough.

8. The bread maker according to claim 5, wherein the baking tray comprises a front half and a rear half, separate from the front half, with a slit between the front half and the rear half, the front half being detachably mounted in the oven chamber.

9. The bread maker according to claim 8, further comprising a scraper, having a slit, in the upper portion of the oven chamber, the mixing bag being placed between the slit of the scraper and the slit of the baking tray when attached to the upper roller and the lower roller, the bread ingredients being scraped downward by the scraper as the mixing bag moves upward through the slit of the scraper, and the bread ingredients being scraped upward as the mixing bag moves downward through slit in the baking tray to remain in the baking tray.

10. The bread maker according to claim 8, wherein after the dough has been formed, the mixing bag moves downward by rotation of the upper roller and the lower roller and ruptures, the dough remaining in the baking tray as the mixing bag passes through the slit of the baking tray and rolls onto the lower roller for disposal.

11. The bread maker according to claim 1, wherein the sensor is mounted on a side surface of the oven chamber.

12. A sensor for a bread maker having a housing forming an oven chamber, a door attached to the housing with an inner panel and an outer panel, and a baking tray detachably mounted within the oven chamber, the sensor comprising:

a sensing member extending from between the outer panel and the inner panel, through the inner panel, to the oven chamber, and having a first end between the outer panel and the inner panel and a second end within the oven chamber;

a sensing switch attached to the inner panel; and an operating lever between the inner panel and the outer panel and having a top end and a bottom end connected to the first end of the sensing member, wherein when the baking tray is mounted in the oven chamber and the door is closed, the second end of the sensing member contacts the baking tray and is pushed back in the direction of the door, the first end pushing back the operating lever to cause the top end of the operating lever to tilt toward and contact the sensing switch to sense whether the baking tray is mounted in the oven chamber.

13. The sensor according to claim 12, further comprising a projected supporting part connected to the inner panel between the sensing switch and the sensing member and projecting toward the operating lever, a center of the operating lever being loosely attached to the projected supporting part, the operating lever pivoting on the projected supporting part to press the top of the operating lever against the sensing switch as the first end of the sensing member pushes back the bottom end of the operating lever as the door is closed.

14. The sensor according to claim 12, wherein the operating lever is made of an elastic material.

15. The sensor according to claim 12, wherein the sensor is mounted on a side surface of the oven chamber.

* * * * *